United States Patent
Chae et al.

(10) Patent No.: US 11,575,117 B2
(45) Date of Patent: Feb. 7, 2023

(54) PRE-LITHIATION METHOD OF SILICON OXIDE ANODE ELECTRODES FOR SECONDARY BATTERY

(71) Applicant: LG CHEM, LTD., Seoul (KR)

(72) Inventors: Oh Byong Chae, Daejeon (KR); Jun Hyuk Song, Daejeon (KR); Eun Kyung Kim, Daejeon (KR); Yoon Ah Kang, Seoul (KR); Sang Wook Woo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 16/465,900

(22) PCT Filed: Apr. 4, 2018

(86) PCT No.: PCT/KR2018/003989
§ 371 (c)(1),
(2) Date: May 31, 2019

(87) PCT Pub. No.: WO2018/212453
PCT Pub. Date: Nov. 22, 2018

(65) Prior Publication Data
US 2019/0305298 A1   Oct. 3, 2019

(30) Foreign Application Priority Data

May 19, 2017  (KR) .................. 10-2017-0062345

(51) Int. Cl.
*H01M 4/04* (2006.01)
*H01M 4/1391* (2010.01)
(Continued)

(52) U.S. Cl.
CPC ....... *H01M 4/1391* (2013.01); *H01M 4/0404* (2013.01); *H01M 4/0435* (2013.01);
(Continued)

(58) Field of Classification Search
CPC ............. H01M 4/0404; H01M 4/0435; H01M 4/0459; H01M 4/0495; H01M 4/131;
(Continued)

(56) References Cited

U.S. PATENT DOCUMENTS 9,748,599 B2 * 8/2017 Grant .................. H01M 10/446
9,837,659 B2 * 12/2017 Balogh ............... H01M 4/1393
(Continued)

FOREIGN PATENT DOCUMENTS

CN   105470465 A   4/2016
JP   2006-216451 A   8/2006
(Continued)

OTHER PUBLICATIONS

Feng et al., "Facile approach to SiO$^y$/Si/C composite anode material from bulk SiO for lithium ion batteries", Physical Chemistry Chemical Physics, Jul. 2013, vol. 15, pp. 14420-14426, total 8 pages.
(Continued)

*Primary Examiner* — Brian K Talbot
(74) *Attorney, Agent, or Firm* — Birch, Stewart, Kolasch & Birch, LLP

(57) ABSTRACT

A method for pre-lithiating a silicon oxide negative electrode for a secondary battery, specifically a method for pre-lithiation by immersing the silicon oxide negative electrode in an electrolytic solution for wetting, and by applying pressure while a lithium metal is in direct contact with the wetted silicon oxide negative electrode. The silicon oxide negative electrode for a secondary battery manufactured through pre-lithiation provided in the present disclosure has improved initial irreversibility, and a secondary battery manufactured using such a silicon oxide negative electrode for a secondary battery has excellent charge/discharge efficiency.

5 Claims, 1 Drawing Sheet

(51) Int. Cl.
- *H01M 4/131* (2010.01)
- *H01M 4/485* (2010.01)
- *H01M 10/0525* (2010.01)
- *H01M 4/02* (2006.01)

(52) U.S. Cl.
CPC ....... *H01M 4/0459* (2013.01); *H01M 4/0495* (2013.01); *H01M 4/131* (2013.01); *H01M 4/485* (2013.01); *H01M 10/0525* (2013.01); H01M 2004/027 (2013.01)

(58) Field of Classification Search
CPC .............. H01M 4/1391; H01M 4/485; H01M 10/0525; H01M 2004/027
USPC .................................................... 427/58, 115
See application file for complete search history.

(56) References Cited

U.S. PATENT DOCUMENTS

| | | | | |
|---|---|---|---|---|
| 11,183,683 | B2* | 11/2021 | Chae | H01M 4/043 |
| 2005/0130043 | A1* | 6/2005 | Gao | H01M 4/043 |
| | | | | 429/231.95 |
| 2007/0218365 | A1 | 9/2007 | Takezawa et al. | |
| 2009/0148773 | A1* | 6/2009 | Volkov | H01M 4/1393 |
| | | | | 429/231.5 |
| 2013/0003261 | A1* | 1/2013 | Remizov | C25D 3/54 |
| | | | | 361/527 |
| 2014/0310951 | A1* | 10/2014 | Grant | H01M 4/139 |
| | | | | 29/623.2 |
| 2015/0333385 | A1* | 11/2015 | Sun | H01M 4/386 |
| | | | | 429/405 |
| 2016/0019781 | A1 | 1/2016 | Lee et al. | |
| 2016/0133394 | A1* | 5/2016 | Sakshaug | C01B 32/05 |
| | | | | 361/502 |
| 2016/0141596 | A1* | 5/2016 | Uhm | H01M 4/587 |
| | | | | 429/220 |
| 2016/0181594 | A1* | 6/2016 | Balogh | H01M 4/139 |
| | | | | 156/247 |
| 2017/0040604 | A1* | 2/2017 | Bakenov | H01M 4/625 |
| 2017/0170511 | A1* | 6/2017 | Yu | H01M 10/052 |
| 2018/0175387 | A1* | 6/2018 | Kim | H01M 4/133 |
| 2020/0058929 | A1* | 2/2020 | Chae | H01M 4/0404 |

FOREIGN PATENT DOCUMENTS

| | | |
|---|---|---|
| JP | 2007-500922 A | 1/2007 |
| JP | 2008-41489 A | 2/2008 |
| JP | 2009-76372 A | 4/2009 |
| JP | 2015-88450 A | 5/2015 |
| JP | 2016-511916 A | 4/2016 |
| JP | 6112111 B2 | 4/2017 |
| KR | 10-1999-0086308 A | 12/1999 |
| KR | 10-2006-0056969 A | 5/2006 |
| KR | 10-1162794 B1 | 7/2012 |
| KR | 10-2012-0092529 A | 8/2012 |
| KR | 10-2013-0007320 A | 1/2013 |
| KR | 10-1397415 B1 | 5/2014 |
| KR | 10-2014-0072339 A | 6/2014 |
| KR | 10-2015-0110797 A | 10/2015 |
| KR | 10-1594874 B1 | 2/2016 |
| KR | 10-2017-0034774 A | 3/2017 |

OTHER PUBLICATIONS

International Search Report for PCT/KR2018/003989 dated Aug. 1, 2018.

European Office Action, dated May 27, 2020, for European Application No. 18802551.4.

Seong et al., "Electrochemical Study of SiO Initial Efficiency for Lithium Ion Batteries," 2016 3rd Asia-Pacific World Congress on Computer Science and Engineering (APWC on CSE), 2016 (Dec. 5, 2016), pp. 78-83, XP033105168.

* cited by examiner

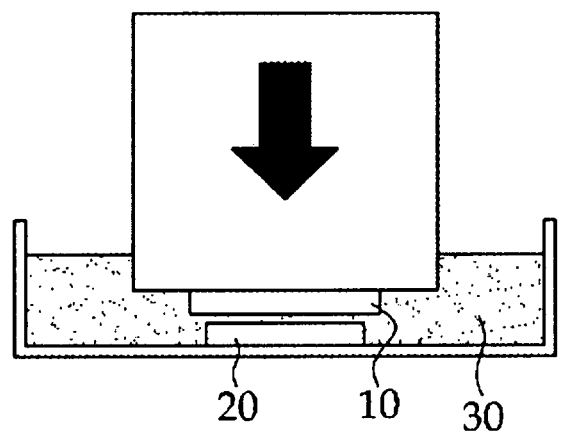

PRE-LITHIATION METHOD OF SILICON OXIDE ANODE ELECTRODES FOR SECONDARY BATTERY

TECHNICAL FIELD

The present invention is a method for pre-lithiating a silicon oxide negative electrode for a secondary battery. Specifically, the present invention is a method for pre-lithiation by immersing the silicon oxide negative electrode in an electrolytic solution for wetting, and by applying pressure while a lithium metal is in direct contact with the silicon oxide negative electrode.

BACKGROUND ART

As the price of energy sources rises due to depletion of fossil fuels and the interest in environmental pollution increases, the demand for environmentally friendly alternative energy sources has become an indispensable factor for future life. In particular, as the technologies related to mobile devices are developed and the demand for the mobile devices increases, the demand for secondary batteries as an energy source is rapidly increasing.

Typically, in terms of the shape of the battery, there is a high demand for a rectangular secondary battery and a pouch-type secondary battery that can be applied to products such as mobile phones with a small thickness. In terms of material, there is a high demand for a lithium ion secondary battery such as lithium ion polymer battery having high energy density, discharge voltage, and output stability.

Generally, in order to manufacture a secondary battery, an active material is applied to the surface of a current collector to form a positive electrode and a negative electrode, and a separator is interposed therebetween to form an electrode assembly, then the electrode assembly is mounted at the inside of a cylindrical or rectangular metal or aluminum laminate sheet, and a liquid electrolyte is injected or coalesced into the electrode assembly or a solid electrolyte is used to manufacture the secondary battery.

Generally, a carbon material such as graphite is used as a negative electrode of a lithium secondary battery, but the theoretical capacity density of carbon is 372 mAh/g (833 mAh/cm3). Therefore, silicon (Si), tin (Sn), oxides thereof, and alloys thereof, which are alloyed with lithium to improve the energy density of the negative electrode, are examined as negative electrode materials. Among them, silicon-based materials have received attention due to their low cost and high capacity (4200 mAh/g).

However, the silicon has poor mechanical stability due to volume change during intercalation/deintercalation of lithium ions and there is a problem that cycle characteristic is deterred. Therefore, it is necessary to develop a material with excellent stability and capable of ensuring cycle characteristics when the material used as an active material of an electrochemical device by having structural stability In addition, when the silicon-based negative electrode active material is used, there is a problem that a initial irreversible capacity is large. In charging/discharging reaction of the lithium secondary battery, a lithium released from a positive electrode is intercalated in negative electrode during charging, and the lithium returns to the positive electrode during discharging. In the case of the silicon anode active material, the volume change and the surface side reaction are so severe that a large amount of lithium intercalated into the negative electrode at the time of initial charging can not return to the positive electrode again, resulting in an increase in initial irreversible capacity. When the initial irreversible capacity increases, there occurs a problem that the battery capacity and the cycle are rapidly reduced.

In order to solve the above problems, a method of pre-lithiating of a silicon oxide negative electrode including a silicon-based negative electrode active material is known. As the method of pre-lithiating, a method of producing an electrode by lithiating the negative electrode active material by a physicochemical method and a method of pre-lithiating the negative electrode electrochemically are known.

The conventional physicochemical method has a risk of fire and explosion due to environmental factors to be performed at high temperature, The conventional electrochemical method has a problem that the initial irreversible capacity cannot be uniformly controlled and the production cost increases.

DISCLOSURE

Technical Problem

The present invention is to solve the above-described technical problems according to the conventional art. The present invention is directed to providing a negative electrode having excellent initial irreversibility by immersing a silicon oxide negative electrode for a secondary battery in an electrolyte solution for wetting, and bringing the wetted silicon oxide negative electrode for a secondary battery into direct contact with a lithium metal, and a battery having excellent charging/discharging properties using the same.

Technical Solution

According to an exemplary embodiment of the present invention, a method for pre-lithiating a silicon oxide negative electrode for a secondary battery, which includes: a first step of immersing the silicon oxide negative electrode for the secondary battery in an electrolyte solution for wetting; and a second step of bringing the wetted silicon oxide negative electrode for the secondary battery into direct contact with a lithium metal, is provided.

According to another exemplary embodiment of the present invention, the second step is performed in the electrolyte solution in the first step.

According to still another exemplary embodiment of the present invention, the second step includes bringing the silicon oxide negative electrode for the secondary battery into direct contact with the lithium metal with a force of 0.1 to 10 kgf per unit area of 1.5 cm$^2$.

According to yet another exemplary embodiment of the present invention, the second step includes bringing the silicon oxide negative electrode for the secondary battery into direct contact with the lithium metal for 5 to 50 minutes.

According to yet another exemplary embodiment of the present invention, the first step includes immersing the silicon oxide negative electrode for the secondary battery in the electrolyte solution for 10 minutes to 50 hours.

According to yet another exemplary embodiment of the present invention, the electrolyte solution in the first step is prepared by dissolving any one or two or more lithium salts selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chloroborane lithium, a lower aliphatic lithium carboxylate and lithium tetraphenylborate in a solvent.

According to yet another exemplary embodiment of the present invention, the solvent is any one or a mixture of two or more selected from the group consisting of N-methyl-2-pyrrolidinone, propylene carbonate, ethylene carbonate, butylene carbonate, dimethyl carbonate, diethyl carbonate, ethylmethyl carbonate, gamma-butyrolactone and 1,2-dimethoxy ethane.

According to yet another exemplary embodiment of the present invention, a method for manufacturing a silicon oxide negative electrode for a secondary battery, which includes: preparing a slurry by mixing an electrode active material including silicon oxide, a conducting material, and a binder; coating a current collector with the mixed slurry; pressing the coated current collector with a roller, and punching and drying the resultant to be a unit electrode; and pre-lithiating the dried unit electrode according to the pre-lithiating method described above, is provided.

According to yet another exemplary embodiment of the present invention, a silicon oxide negative electrode for a secondary battery manufactured by the above-described method is provided.

According to yet another exemplary embodiment of the present invention, a secondary battery including the negative electrode is provided.

According to yet another exemplary embodiment of the present invention, the secondary battery has a charge/discharge efficiency in a first charge/discharge cycle of 75 to 99%, which is expressed by the following Equation 1 at a current density of 0.1 C:

$$\text{Charge/discharge efficiency (\%)} = \frac{\text{Discharge capacity}}{\text{Charge capacity}} \times 100. \quad \text{[Equation 1]}$$

Advantageous Effects

A silicon oxide negative electrode for a secondary battery manufactured through pre-lithiation provided in the present invention has improved initial irreversibility, and a secondary battery manufactured using such a silicon oxide negative electrode for a secondary battery has excellent charge/discharge efficiency.

BRIEF DESCRIPTION OF THE DRAWINGS

FIG. 1 is a schematic diagram illustrating pre-lithiation using a direct contacting method according to the present invention.

DETAILED DESCRIPTION OF THE PREFERRED EMBODIMENTS

Hereinafter, the present invention will be described in detail. The present invention is not limited by the following examples and experimental examples. The examples according to the present invention may be altered in various forms, and the scope of the present invention should not be construed to be limited to the following examples. The examples of the present invention are provided to completely explain the present invention to those of ordinary skill in the art.

The pre-lithiation of a silicon oxide negative electrode for a secondary battery according to the present invention is performed by a first step of immersing a silicon oxide negative electrode for a secondary battery in an electrolyte solution for wetting; and a second step of bringing the wetted silicon oxide negative electrode for a secondary battery into direct contact with a lithium metal.

The silicon oxide negative electrode is a negative electrode formed using silicon and an oxide thereof as a main component to increase a capacity density of a conventional negative electrode formed using a carbon material such as graphite. Since the silicon oxide used in the present invention has a theoretical capacity density of 4200 mAh/g, which is much higher than that of a carbon material, that is, 372 mAh/g, it may be suitably used as a negative electrode for a secondary battery. However, since the silicon oxide negative electrode has a high initial irreversible capacity due to low morphological stability, a reduced electrode capacity or a risk of losing a cell balance, pre-lithiation as used in the present invention is required.

In the first step of pre-lithiation, the silicon oxide negative electrode is immersed in an electrolyte solution for wetting. The electrolyte solution is prepared by dissolving a lithium salt in a solvent, and the type of electrolyte solution is not limited as long as it can promote side reactions that will occur during the early charging of the silicon oxide negative electrode. As a lithium salt, any one or two or more selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chloroborane lithium, lower aliphatic lithium carboxylate and lithium tetraphenyl borate may be used, and as a solvent, any one or a mixture of two or more selected from the group consisting of N-methyl-2-pyrrolidinone, propylene carbonate, ethylene carbonate, butylene carbonate, dimethyl carbonate, diethyl carbonate, ethylmethyl carbonate, gamma-butyrolactone and 1,2-dimethoxy ethane may be used.

The first step of immersing the silicon oxide negative electrode in an electrolyte solution for wetting is performed by immersing the silicon oxide negative electrode in the electrolyte solution for 10 minutes to 50 hours. According to the wetting, a volume of the silicon oxide negative electrode increases to a specific level, and a distance between silicon oxide particles suitably increases, thereby deeply permeating the electrolyte solution in-between the particles. Therefore, a contact area between the electrolyte solution and the silicon oxide negative electrode increases, such that lithium ions easily enter the silicon oxide negative electrode due to direct contact. When immersed for less than 10 minutes, the silicon oxide negative electrode does not sufficiently expand, and the electrolyte solution cannot sufficiently and deeply permeate into the silicon oxide negative electrode, such that the pre-lithiation induced by direct contact may not sufficiently occur in the subsequent steps, and when immersed for more than 50 hours, the silicon oxide negative electrode is exposed to the electrolyte solution for too long, resulting in low morphological stability, a low adhesive strength of the electrode, and a reduced cell balance. The immersion time in the electrolyte solution is more preferably 1 to 30 hours, and further more preferably 3 to 20 hours.

The second step of pre-lithiation is bringing the wetted silicon oxide negative electrode into direct contact with a lithium metal. Similar to the initial irreversible circumstances, according to the direct contact, lithium ions enter and are positioned in the silicon oxide negative electrode, such that less irreversibility will occur in subsequent charging cycles according to the space of the lithium ions, a degree of initial irreversibility of the silicon oxide negative electrode may be controlled.

The second step is performed by bringing the silicon oxide negative electrode for a secondary battery into direct contact with the lithium metal with a force of 0.1 to 10 kgf per unit area of 1.5 cm² and for 5 to 50 minutes. When the bringing into direct contact is performed with a force of less than 0.1 kgf or for less than 5 minutes, sufficient pre-lithiation may not occur, leading to high initial irreversibility, and when the bringing into direct contact is performed with a force of more than 10 kgf or over 50 minutes, the pre-lithiation is excessively performed so as to reduce an electrode capacity. It is more preferable that the silicon oxide negative electrode is brought into direct contact with the lithium metal with a force of 0.2 to 5 kgf per unit area of 1.5 cm², and it is further more preferable that the direct contact is performed with a force of 0.5 to 2 kgf per unit area of 1.5 cm². In addition, more preferably, the silicon oxide negative electrode is brought into direct contact with the lithium metal for 10 to 30 minutes.

FIG. 1 is a schematic diagram illustrating pre-lithiation induced by a direct contacting method according to the present invention. Pre-lithiation is performed by immersing an electrode 20 in an electrolyte solution 30 for wetting, and bringing the electrode into direct contact with a lithium metal 10 by placing the lithium metal on the electrode and pressing the lithium metal-placed electrode with a specific force. The lithium metal may have an area that entirely covers the electrode, and a method of applying the force to the lithium metal is not limited. A mechanically pressing method using a press is advantageous for applying a specific force for a specific time. After wetting, the lithium metal may be in direct contact with the electrode in a state in which the electrolyte solution has been removed or in the electrolyte solution. Taking a reduction in a process time and a pre-lithiation effect into account, it is more preferable that the electrode is in direct contact with the lithium metal in the electrolyte solution.

The present invention is directed to providing a method for manufacturing a silicon oxide negative electrode, the method including pre-lithiation in the same manner as described above. The method for manufacturing a silicon oxide negative electrode includes: preparing a slurry by mixing an electrode active material containing silicon oxide, a conducting material, and a binder; coating a current collector with the mixed slurry; pressing the coated current collector with a roller, and punching and drying the resultant to be a unit electrode; and pre-lithiating the dried unit electrode according to the pre-lithiating method described above.

Since the above-described method is the same as the conventional method for manufacturing a negative electrode for a secondary battery except the pre-lithiation step, the pre-lithiation step may be easily added to the conventional process, and since the additional process itself is very easy and simple, production costs are not greatly increased. In addition, while the conventional, physicochemical method is performed at a high temperature, there is a high risk of fire and explosion, and the conventional, electrochemical method has difficulty in homogenization and requires a high cost, the pre-lithiation method according to the present invention does not require a high cost, and facilitates relatively stable and uniform pre-lithiation.

Meanwhile, the present invention is directed to providing a secondary battery including the negative electrode manufactured by the method described above.

The secondary battery according to the present disclosure includes an electrode assembly which is made by lamination of electrodes of different polarities in a state that is separated by a separator, and the electrode assembly includes a positive electrode including positive electrode active materials, a negative electrode including negative electrode active materials, and a separator.

Specifically, the positive electrode, for example, is made by applying the mixture of the positive electrode active materials, a conductive agent and a binder on the positive electrode current collector and then drying the positive electrode current collector, and a filler may be added to the mixture.

The positive electrode active material according to the present disclosure may be used together with a compound which uses lithium intercalation material as the main element such as layered compounds such as lithium cobalt oxide ($LiCoO_2$) and lithium nickel oxide ($LiNiO_2$), and compounds substituted with one or more transition metals; lithium manganese oxide ($LiMnO_2$) such as $Li_{1+x}Mn_{2-x}O_4$ (here, x is between 0 and 0.33), $LiMnO_3$, $LiMn_2O_3$, $LiMnO_2$, etc.; lithium copper oxide ($Li_2CuO_2$); Vanadium oxide such as $LiV_3O_8$, $LiFe_3O_4$, $V_2O_5$, $Cu_2V_2O_7$; lithiated nickel oxide expressed as chemical formula $LiNi_{1-x}M_xO_2$ (here, M=Co, Mn, Al, Cu, Fe, Mg, B or Ga and, x= between 0.01 and 0.3); lithium manganese composite oxide expressed as chemical formula $LiMn_{2-x}M_xO_2$ (here, M=Co, Ni, Fe, Cr, Zn or Ta, x= between 0.01 and 0.1) or $Li_2Mn_3MO_8$ (here, M=Fe, Co, Ni, Cu or Zn); $LiMn_2O_4$ in which part of lithium is substituted with alkaline earth metal ions; disulfide compound; or composite oxide formed by combination thereof $Fe_2(MoO_4)_3$.

The positive electrode current collector is generally made to have a thickness of 3 to 500 μm. The positive electrode current collector is not particularly limited as long as it has high conductivity without causing chemical changes in the battery. Examples of the positive electrode current collector include stainless steel, aluminum, nickel, titanium, calcined carbon, and stainless steel or aluminum of which the surface has been treated with carbon, nickel, titanium, silver, or the like. The current collector may have fine irregularities on the surface thereof to increase the adhesion of the positive electrode active material, and various forms such as a film, a sheet, a foil, a net, a porous body, a foam, and a nonwoven fabric are possible.

The conductive agent is usually added in an amount of 1 to 50 wt % based on the total weight of the mixture including the positive electrode active material. Such a conductive agent is not particularly limited as long as it has electrical conductivity without causing a chemical change in the battery, and examples thereof include graphite such as natural graphite and artificial graphite; carbon black such as carbon black, acetylene black, Ketjenblack, channel black, furnace black, lamp black, and summer black; conductive fibers such as carbon fiber and metal fiber; metal powders such as carbon fluoride, aluminum and nickel powder; conductive whiskey such as zinc oxide and potassium titanate; conductive oxides such as titanium oxide; conductive materials such as polyphenylene derivatives and the like.

The binder is a component which assists in bonding of the active material and the conductive material and binding with the current collector, and is usually added in an amount of 1 to 50 wt % based on the total weight of the mixture containing the positive electrode active material. Examples of such binders include polyvinylidene fluoride, polyvinyl alcohol, carboxy methyl cellulose (CMC), starch, hydroxyl propyl cellulose, regenerated cellulose, polyvinyl pyrrolidone, tetrafluoro ethylene, polyethylene, Polypropylene, ethylene-propylene-diene terpolymer (EPDM), sulfonated EPDM, styrene butylene rubber, fluorine rubber, various copolymers and the like.

The filler is optionally used as a component for inhibiting expansion of a positive electrode, and is not particularly limited as long as it is a fibrous material without causing a chemical change in the battery. Examples of the filler include olefin polymers such as polyethylene and polypropylene; fibrous materials such as glass fibers and carbon fibers.

The negative electrode may be formed by applying a negative electrode material on the negative electrode current collector and drying the negative electrode material. If necessary, the negative electrode may further include the above-described components.

The negative electrode current collector is generally made to have a thickness of 3 to 500 μm. The negative electrode current collector is not particularly limited as long as it has conductivity without causing chemical changes in the battery, and examples thereof include copper, stainless steel, aluminum, nickel, titanium, calcined carbon, and copper or stainless steel of which the surface has been treated with carbon, nickel, titanium, or silver, and an aluminum-cadmium alloy. In addition, like the positive electrode current collector, fine unevenness can be formed on the surface to enhance the bonding force of the negative electrode active material, and it can be used in various forms such as films, sheets, foils, nets, porous bodies, foams, etc.

Both a polyolefin-based separator commonly known as a separator for insulating the electrodes between the positive electrode and the negative electrode, and a composite separator having an organic and inorganic composite layer formed on the olefin-based substrate can be used and are not particularly limited.

The electrolyte injected into the secondary battery is a non-aqueous electrolyte containing a lithium salt, which is composed of a nonaqueous electrolyte and lithium. As the non-aqueous electrolyte, a non-aqueous electrolyte, a solid electrolyte, an inorganic solid electrolyte and the like are used.

Examples of the nonaqueous electrolyte include N-methyl-2-pyrrolidinone, propylene carbonate, ethylene carbonate, butylene carbonate, dimethyl carbonate, diethyl carbonate, gamma-butylolactone, 1,2-dimethoxyethane, tetrahydroxyfranc, 2-methyltetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl pyrophosphate, ethyl propionate and the like.

Examples of the organic solid electrolyte include polymers such as a polyethylene derivative, a polyethylene oxide derivative, a polypropylene oxide derivative, a phosphate ester polymer, an agitation lysine, a polyester sulfide, a polyvinyl alcohol, a polyvinylidene fluoride, and an ionic dissociation group.

Examples of the inorganic solid electrolyte include Li nitrides such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, halides, sulfates, etc.

The lithium salt is a substance that is soluble in the non-aqueous electrolyte, and examples thereof include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylate lithium, lithium 4-phenylborate, imide and the like.

For the purpose of improving charge/discharge characteristics and flame retardancy, pyridine, triethylphosphite, triethanolamine, cyclic ethers, ethylenediamine, glyme, hexahydrate triamide, nitrobenzene derivatives, sulfur, quinone imine dyes, N-substituted oxazolidinones, N, N-substituted imidazolidines, ethylene glycol dialkyl ether, ammonium salt, pyrrole, 2-methoxyethanol, aluminum trichloride, etc. may be added to the non-aqueous electrolyte. In some cases, a halogen-containing solvent such as carbon tetrachloride or ethylene trifluoride may be further added to impart nonflammability, or a carbon dioxide gas may be further added to improve high temperature storage characteristics.

The present disclosure will be described in detail through the following embodiments. However, the following embodiments and experimental examples are explained to illustrate the present disclosure, and the scope of the present disclosure is not limited to these embodiments and experimental examples.

Example 1

<Manufacture of Negative Electrode>

A negative electrode composite slurry was prepared by adding 92 wt % SiO as a negative electrode active material, 3 wt % Denka Black (conducting material), 3.5 wt % SBR (binding agent), and 1.5 wt % CMC (thickening agent) to water.

A negative electrode was manufactured by coating one surface of a copper current collector with the negative electrode composite slurry, drying and rolling the coated copper current collector, and punching the resulting copper current collector to a specific size.

<Pre-Lithiation Using Wetting and Direct Contact>

An electrolyte solution was prepared by dissolving 1M lithium hexafluorophosphate ($LiPF_6$) in a solvent prepared by mixing ethylene carbonate (EC) and ethylmethyl carbonate (DEC) in a volume ratio of 50:50, the negative electrode manufactured in the above-described step was immersed in the electrolyte solution for wetting for 5 hours, and a lithium metal was brought into contact with the negative electrode and then pressed with a force of 1 kgf per unit area of 1.5 $cm^2$ for 10 minutes. The negative electrode manufactured by wetting and direct contacting was washed with dimethyl carbonate (DMC) and then dried.

<Manufacture of Lithium Secondary Battery>

As a counter electrode, a lithium metal foil (150 μm) was used, a coin-type half-cell was manufactured by interposing a polyolefin separator between the negative electrode and the counter electrode and injecting an electrolyte solution in which 1M lithium hexafluorophosphate ($LiPF_6$) was dissolved in a mixed solvent in which ethylene carbonate (EC) and ethylmethyl carbonate (DEC) were mixed in a volume ratio of 50:50.

<Reversibility Experiment Through First-Cycle Charging/Discharging>

A charge/discharge reversibility test was performed for the coin-type half-cell manufactured described above using an electrochemical battery cycle tester. Charging was performed by applying a current up to a voltage of 0.005 V (vs. Li/Li+) at a current density of 0.1 C-rate in the first cycle, and discharging was performed up to a voltage of 1.5V (vs. Li/Li+) at the same current density used during the charging. At this time, a charge capacity and a discharge capacity were measured, and charge/discharge efficiency was calculated according to Equation 1.

$$\text{Charge/discharge efficiency (\%)} = \frac{\text{Discharge capacity}}{\text{Charge capacity}} \times 100 \quad \text{[Equation 1]}$$

Example 2

A procedure was carried out in the same manner as described in Example 1, except that a contact time was changed to 20 minutes during the pre-lithiation using the direct contacting method of Example 1.

Example 3

A procedure was carried out in the same manner as described in Example 1, except that a contact time was changed to 30 minutes during the pre-lithiation using the direct contacting method of Example 1.

Example 4

A procedure was carried out in the same manner as described in Example 1, except that a contact time was changed to 20 minutes and a contact pressure was changed to 0.5 kgf per 1.5 cm$^2$ during the pre-lithiation using the direct contacting method of Example 1.

Example 5

A procedure was carried out in the same manner as described in Example 1, except that a contact time was changed to 20 minutes and a contact pressure was changed to 2 kgf per 1.5 cm$^2$ during the pre-lithiation using the direct contacting method of Example 1.

Example 6

A procedure was carried out in the same manner as described in Example 1, except that a contact time was changed to 20 minutes and a wetting time was changed to 3 hours during the pre-lithiation using the direct contacting method of Example 1.

Example 7

A procedure was carried out in the same manner as described in Example 1, except that a contact time was changed to 20 minutes and a wetting time was changed to 7 hours during the pre-lithiation using the direct contacting method of Example 1.

Comparative Example 1

A procedure was carried out in the same manner as described in Example 1, except that a contact time was changed to 0 minutes during the pre-lithiation using the direct contacting method of Example 1.

Comparative Example 2

A procedure was carried out in the same manner as described in Example 1, except that a contact time was changed to 60 minutes during the pre-lithiation using the direct contacting method of Example 1.

Comparative Example 3

A procedure was carried out in the same manner as described in Example 1, except that a contact time was changed to 20 minutes and a contact pressure was changed to 0.01 kgf per 1.5 cm$^2$ during the pre-lithiation using the direct contacting method of Example 1.

Comparative Example 4

A procedure was carried out in the same manner as described in Example 1, except that a contact time was changed to 20 minutes and a wetting time was changed to 0 hours during the pre-lithiation using the direct contacting method of Example 1.

Experimental Result: Measurement of First-Cycle Charge/Discharge Efficiency

The first-cycle charge/discharge efficiency measured for each of Examples and Comparative Examples through a charge/discharge reversibility test is shown in Table 1 below.

TABLE 1

| Classification | Lithium metal contact time | Lithium metal contact pressure (per 1.5 cm$^2$) | Electrolyte solution immersion time | First-cycle charge/discharge efficiency |
| --- | --- | --- | --- | --- |
| Comparative Example 1 | — | — | 5 hours | 73% |
| Example 1 | 10 minutes | 1 kgf | 5 hours | 77% |
| Example 2 | 20 minutes | 1 kgf | 5 hours | 85% |
| Example 3 | 30 minutes | 1 kgf | 5 hours | 98% |
| Comparative Example 2 | 60 minutes | 1 kgf | 5 hours | 121% |
| Comparative Example 3 | 20 minutes | 0.01 kgf | 5 hours | 74% |
| Example 4 | 20 minutes | 0.5 kgf | 5 hours | 80% |
| Example 5 | 20 minutes | 2 kgf | 5 hours | 91% |
| Comparative Example 4 | 20 minutes | 1 kgf | — | 74% |
| Example 6 | 20 minutes | 1 kgf | 3 hours | 82% |
| Example 7 | 20 minutes | 1 kgf | 7 hours | 87% |

The first-cycle charge/discharge reversibility of Examples 1 to 3 was considerably improved, compared to that of Comparative Example 1. The charge/discharge reversibility was improved 4% in Example 1, 12% in Example 2, and 25% in Example 3. It is concluded that the improved reversibility of Examples 1 to 3 results from occurrence of surface side reactions in advance caused by the reaction between silicon monoxide (SiO) with the lithium metal previously added through pre-lithiation, and formation of dead particles in advance due to volume expansion caused by undergoing, in advance, a volume change in charging.

As such, after the manufacture of a negative electrode and prior to the manufacture of a lithium secondary battery, side reactions occur, and therefore it seems that lithium consumed in the side reactions may be reduced in the first-cycle charging of the lithium secondary battery, and most of lithium ions used in charging are reversibly released.

Meanwhile, Comparative Example 2 exhibited charge/discharge efficiency of over 100%, which is a phenomenon resulting from the continuous intake of additional lithium ions into an active material even after the initial irreversibility of the negative electrode is reduced because of the intake of an excessive amount of lithium ions into the negative electrode due to long-term contact with the lithium metal, and the actual charge capacity of the cell is reduced.

Accordingly, to perform a direct contacting method, control of contact time and a contact pressure is very important, and as described above, the time for direct contact of a lithium metal is preferably 5 to 50 minutes, and more preferably 10 to 30 minutes. The contact pressure is preferably 0.1 to 10 kgf, more preferably 0.2 to 5 kgf, and further more preferably 0.5 to 2 kgf per 1.5 cm$^2$.

When the time for contact of a lithium metal is less than 5 minutes, the first-cylce charge/discharge efficiency is less than 75%, and by repeated charging/discharging, performance may be drastically reduced, and when the contact time is more than 50 minutes, like Comparative Example 2, a cell balance may be lost.

As above, while the present invention has been described with reference to limited examples and experimental examples, it should be understood that the present invention is not limited to these examples, and can be modified and altered to various forms within the technical idea of the present invention and the equivalents of the accompanying claims by those of ordinary skill in the art.

DESCRIPTION OF SYMBOLS

10: lithium metal
20: electrode
30: electrolyte solution

The invention claimed is:

1. A method for pre-lithiating a silicon oxide negative electrode for a secondary battery, comprising;
   a first step of immersing the silicon oxide negative electrode for the secondary battery in an electrolyte solution for wetting, wherein the first step comprises immersing the silicon oxide negative electrode for the secondary battery in the electrolyte solution for 3 hours to 20 hours; and
   a second step of bringing the wetted silicon oxide negative electrode for the secondary battery into direct contact with a lithium metal, wherein the second step comprises bringing the wetted silicon oxide negative electrode for the secondary battery into direct contact with the lithium metal for 5 to 20 minutes,
   wherein the second step is performed in the electrolyte solution in the first step, and
   wherein the second step comprises bringing the wetted silicon oxide negative electrode for the secondary battery into direct contact with the lithium metal with a force of 1 to 10 kgf per unit area of 1.5 cm$^2$.

2. The method of claim 1, wherein the electrolyte solution in the first step is prepared by dissolving any one or two or more lithium salts selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chloroborane lithium, a lower aliphatic lithium carboxylate and lithium tetraphenylborate in a solvent.

3. The method of claim 2, wherein the solvent is any one or a mixture of two or more selected from the group consisting of N-methyl-2-pyrrolidinone, propylene carbonate, ethylene carbonate, butylene carbonate, dimethyl carbonate, diethyl carbonate, ethylmethyl carbonate, gamma-butyrolactone and 1,2-dimethoxy ethane.

4. The method of claim 1, wherein the contact pressure is 0.2 to 5 kgf per 1.5 cm$^2$.

5. The method of claim 1, wherein the contact pressure is 0.5 to 2 kgf per 1.5 cm$^2$.

* * * * *